Dec. 27, 1949    E. FURER    2,492,418
FILM PRESSURE PLATE
Filed Nov. 19, 1946
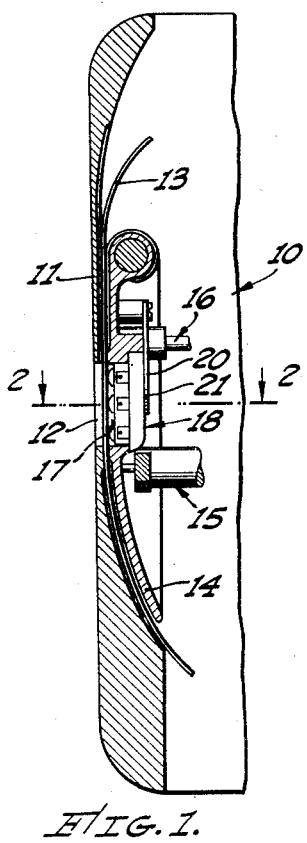
FIG. 1.
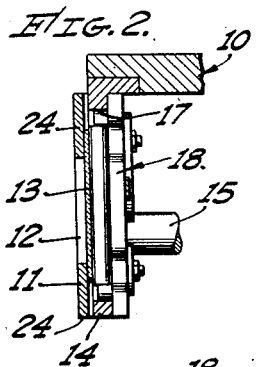
FIG. 2.
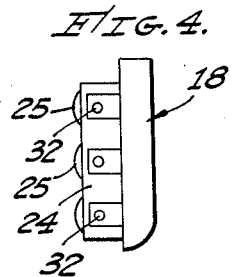
FIG. 4.
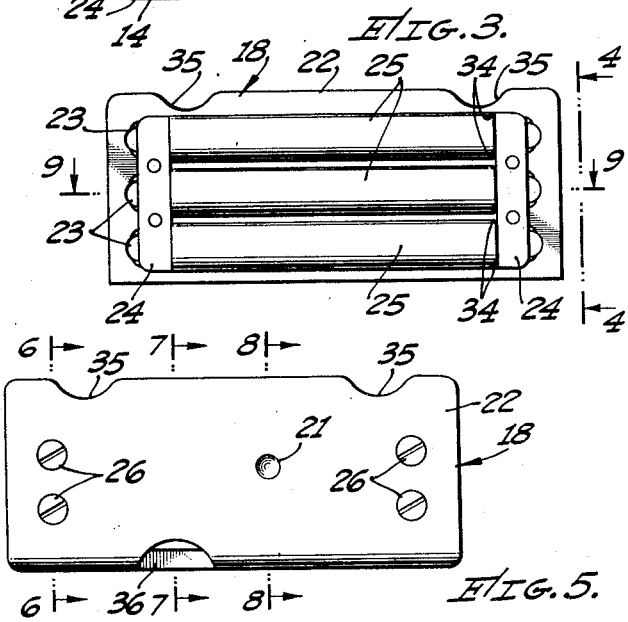
FIG. 3.
FIG. 5.
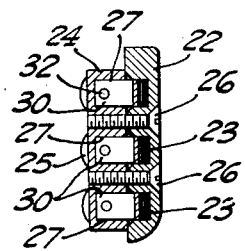
FIG. 6.
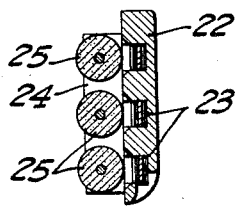
FIG. 7.
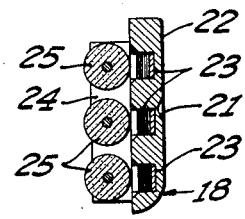
FIG. 8.
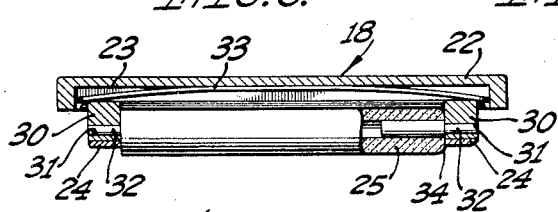
FIG. 9.
EDWARD FURER,
INVENTOR.
BY
ATTORNEY.

Patented Dec. 27, 1949

2,492,418

UNITED STATES PATENT OFFICE 2,492,418

FILM PRESSURE PLATE

Edward Furer, Burbank, Calif.

Application November 19, 1946, Serial No. 710,911

7 Claims. (Cl. 88—17)

My invention relates generally to pressure plate assemblies and more particularly to assemblies of this type designed to hold a film firmly against a plate having an aperture therein, such as the film aperture of a motion picture camera.

While pressure plate assemblies of one form or another have been used in motion picture cameras since the earliest stages of the art, the constant demand for better quality pictures and equipment with which to produce them has required constant improvement in the various components of the equipment. The pressure plate of the camera is one of those components which has been the subject of numerous improvements, and while originally a rigidly mounted backing plate was believed to be adequate, modern pressure plates are designed to reduce to a great extent the friction existing between the film and the pressure plate.

One method of reducing this friction is by the provision of rollers of relatively small diameter which are mounted with their axes substantially perpendicular to the length of the film, in back of the aperture plate of the camera so that they bear against the film to urge it firmly against the aperture. While several different roller-type pressure plates have been developed, these have generally been difficult to use since the cameraman has usually had difficulty in threading the film between the plate and the aperture, and the resilient mounting of the plate has required considerable space and placed a severe strain on the film when a splice in the latter has been moved across the plate.

It is therefore a major object of my invention to provide an improved pressure plate for use in motion picture cameras and similar applications where a continuously or intermittently moved film or web must be held against an aperture.

Another object of my invention is to provide such a pressure plate which is simple and compact and requires no further adjustment once it is properly installed.

It is a further object of my invention to provide such a device which is quickly and easily threaded with a minimum of effort.

Still another object of my invention is to provide a device of this type in which the resilient mounting of the various units is of such a nature that no undue strain is placed on the film when splices and similar enlargements are passed across the plate.

It is a still further object of my invention to provide a device of this type which may be precision manufactured in large quantities at a relatively low cost.

These and other objects and advantages of my invention will become apparent from the following description of a preferred form thereof, and from the drawings illustrating that form in which Figure 1 is a side elevational view, partially in section, of a film gate or aperture section of a motion picture camera, with my improved pressure plate mounted therein;

Figure 2 is a plan view, partially in section, taken on the line 2—2 of Figure 1 to show the relationship of the pressure plate of the adjacent components;

Figure 3 is an enlarged elevational view of the front or film side of the pressure plate;

Figure 4 is an end elevational view taken at 4—4 in Figure 3;

Figure 5 is a rear elevational view of the pressure plate shown in Figure 3;

Figure 6 is a cross-sectional view taken at 6—6 in Figure 5;

Figure 7 is a cross-sectional view taken at 7—7 in Figure 5;

Figure 8 is a cross-sectional view taken at 8—8 in Figure 5; and

Figure 9 is a horizontal sectional view taken at 9—9 in Figure 3, and showing the construction of the individual rollers and their mounting.

Referring now to the drawings and particularly to Figures 1 and 2 thereof, the numeral 10 indicates generally a wall portion of a motion picture camera of any suitable type, having an aperture plate 11 with an aperture 12 formed therein. It is to be understood, of course, that a lens (not shown) is mounted in the camera to the left of the aperture 12, as shown in Figure 1, and film 13 is supplied from a magazine (not shown) which is also attached to the camera. A guide plate 14 is suitably attached to the member 10 and spaced a slight distance rearwardly from the aperture plate 11 to form a guide means for the film 13, and a film advancing means of any suitable type is provided to advance the film. Since my improved pressure plate may be used with substantially all modern film advancing mechanism, the particular type of the latter is unimportant for the purposes of this description, and I have indicated only the forward end of a "pull-down" pin or film advancing means 15, and the forward end of registry pin means 16. As is well understood in the art, it will be realized that the pull-down pins 15 engage perforations in the side of the film 13 and move downwardly to advance the film one frame. During this operation, the registry pins 16 are withdrawn from the apertures of film 13, but afterwards they are reinserted in the film while the pull-down pins are being removed therefrom and returned to their upper position, ready to reengage perforations in the film as the registry pins are withdrawn, whereupon the cycle is repeated. Suitable apertures, of course, are formed in the guide plate 14 to receive the pull-down pins 15 and the registry pins 16, and an enlarged opening 17, aligned with the aperture 12, is formed in the guide plate 14 to receive my improved pressure plate 18. The opening 17 is preferably stepped and formed to the exact size of the pressure plate 18 so that the latter fits therein without any possibility of sidewise or vertical motion, and a depending resilient arm 20 is pivotally attached to the guide plate 14 to extend across the pressure plate and engage a recess 21 therein to hold the pressure plate in place. It will be understood, of course, that the method of mounting the pressure plate 18 shown herein is by way of example only, and that other suitable methods may be employed.

As shown in Figures 3, 4, 5 and 9, the pressure plate assembly 18 comprises a generally rectangular supporting member 22 such as a plate or latticework frame having a series of longitudinally extending grooves 23 formed in the forward face thereof. The grooves 23 are parallel and extend substantially the entire length of the supporting plate 22; and near the ends of the grooves, I mount bridging blocks 24. As indicated in Figures 3 and 4, these bridging blocks extend across the supporting plate 22 and carry a plurality of rollers 25 which are adapted to bear against the film 13 and force the latter against the aperture plate 11. The longitudinal grooves 23 preferably extend beyond the bridging blocks 24, and the latter extend across the grooves to bear against the uncut forward face of the plate 22 to which they are held in any convenient manner as by screws 26.

To support the rollers 25, I form a slot 27 in each of the bridging blocks 24, aligned with each of the slots 23 and perpendicular to the axis of the bridging block so that the latter is given a generally toothed appearance, with the tips of the teeth bearing against the forward surface of the supporting member 22. Within each of the slots 27 I mount a bearing block 30 which extends a slight distance beyond the bridging block 24 into the end of the longitudinal slots 23. The bearing blocks 30 are designed to fill the slots 27 so that movement across the latter is reduced to a minimum, but movement into and out of the longitudinal slots 23 is freely permitted.

A hole 31 is formed in each of the bearing blocks 30 parallel to the axis of the longitudinal slots 23, and each of the rollers 25 is provided with a stub shaft 32 which is journaled into this hole. As indicated in Figure 9, the rollers 25 may be formed of a tubular material such as Bakelite, hard rubber, or other appropriate substance into which the stub shaft 32 is placed. In this way, the rollers 25 are rotatably supported in the bearing blocks 30, and each roller is mounted for independent forward and rearward motion with respect to the supporting member 22, while being held substantially aligned with the corresponding groove 23.

Within each of the longitudinal grooves 23, I mount a leaf spring 33 which is curved so that its mid-portion bears against the base of the groove while its ends bear against the bearing blocks 30 to urge the latter outwardly. Each roller 25 is thus resiliently held to the supporting member 22, and as indicated in Figures 6, 7 and 8, I prefer to chamfer the edges of the longitudinal grooves 23 so that the rollers may move to their rearward limiting position without touching or rubbing against the supporting plate.

It will be noted that the bearing blocks 30 have no key ways or guides formed therein to restrain their movement, and they are held in the bridging blocks 24 solely by their extending into the ends of the longitudinal grooves 23 so that they may not be moved outwardly unless the device is purposely disassembled. As a result of this "floating" mounting, one end of a roller 25 may be moved rearwardly while the other end remains in its normal forward position; and the bearing blocks 30 will pivot a slight amount to permit this movement of the roller, and then return the latter to its original position without binding. Consequently, should the film 13 have a diagonal splice or some comparable irregularity therein, one end of each of the rollers 25 will be moved rearwardly by the thicker portion, and the other ends of the rollers will then be moved rearwardly as the splice reaches them. The first ends will then be moved forwardly as the thickened portion leaves them, and finally the opposite ends will be returned to their normal position as the splice moves past the pressure plate 18. It will be seen that this sequential movement of the ends of the rollers 25 tends to rotate the latter about a vertical axis, but because of the independent resilient mounting of each end of each of the rollers, smooth operation with substantially no change in pressure is obtained.

Where the splice is one which extends perpendicularly across the film, each of the rollers 25 will in turn be moved rearwardly with substantially no rotation about a vertical axis, and with a constant pressure exerted by each of the rollers not in contact with the splice. As a result, a smoother operation of the film is obtained, with less strain being imposed upon the latter.

Because of the construction of motion picture cameras, it is generally customary to place the film 13 between the aperture plate 11, and the pressure plate assembly 18 by sliding the film in sidewise between the two. While some prior pressure plates have been constructed so that they may be moved away from the aperture plate 11 when the film 13 is being inserted therebetween, this is generally an unsatisfactory arrangement since the photographer is usually holding one set of pins, such as the registry pins 16, disengaged from the film 13 while attempting to insert the latter in its proper position. In my improved pressure plate assembly, I have overcome this difficulty by providing one end of each of the rollers 25 with a slightly curved surface 34, as indicated in Figures 3 and 9, and mounting the rollers with these ends at the film insertion side. The edge of the film being inserted will thus bear against these curved surfaces 34, and force the ends of the rollers rearwardly to provide, in effect, an automatic operation of the pressure plate from the aperture plate 11.

As indicated in Figure 2, the length of the rollers 25 is preferably slightly greater than the width of the film 13, and is wider than the aperture 12. The natural tendency of motion picture film is to curl so that the emulsion surface is concave across the width of the film. By extending the rollers 25 across the entire width of the film 13, however, this tendency of the film to curl is overcome and a plane surface is presented to the light rays entering through aperture 12.

It is desirable to have the registry pins 16 located very close to the aperture 12 so that the possibilities of non-registration of a frame of the film 13 with the aperture will be reduced to a minimum. Because of the construction of some cameras, it is desirable to provide notches 35 in the upper edge of the supporting member 22 to receive the registry pins 16, though it will be understood that where the construction of the camera permits of it, these notches are omitted. Similarly, the pull-down or film advancing pins 15 are sometimes carried on a supporting arm which would hit against the supporting member 22 were a notch 36 not provided in the lower portion of the plate. This latter notch may likewise be omitted should the construction of the camera be such as to permit this.

It will thus be seen that I have provided a very simple and compact pressure plate assembly possessing advantages not heretofore available with previous designs. The compactness of the design may be visualized from the fact that, by way of example only, pressure plates of this type have been built which measure ¼" from the back of the support plate 22 to the forward surface of the bridging block 24. In addition, the fact that the resilient mounting of the roller 25 is entirely self-contained, means that there is no need to provide an auxiliary resilient supporting member for the supporting plate 22 which would require additional space within the already crowded confines of the camera. Furthermore, the fact that the plate may be notched, as indicated by the notches 35 and 36, permits the construction of a very compact film advancing mechanism in which all space is used to the best possible advantage.

From the foregoing it will be seen that I have provided a film pressure plate which is fully capable of achieving all the objects and advantages heretofore set forth, but it will be apparent that it is possible to make modifications in this device which in nowise depart from the spirit of the invention as defined herein. While I have shown and described a preferred form of my invention, I do not wish to be limited to the particular form or arrangement of parts herein described and shown, except as defined by my claims.

I claim:

1. A pressure plate adapted to urge a film or web against an opening, which includes: a supporting member; a plurality of rollers supported by said member and adapted to bear against said film across substantially the entire width of the latter, each of said rollers having a curved surface of relatively small radius connecting one end and the periphery of said roller; and resilient means independently urging each of said rollers toward said film.

2. A pressure plate adapted to urge a film or web against an opening, which includes: a supporting member; a plurality of rollers adapted to bear against said film, each of said rollers having a curved surface of relatively small radius connecting one end and the periphery of said roller; bearing means attached to said member for movement with respect thereto, each of said bearing means rotatably supporting one end of one of said rollers; and resilient means independently urging each of said bearing means and the end of said roller carried thereby toward said film.

3. A pressure plate adapted to urge a film or web against an opening, which includes: a supporting member; a plurality of parallel rollers adapted to bear against said film, each of said rollers having a curved surface of relatively small radius connecting one end with the cylindrical surface of said roller; a pair of bridging blocks attached to said supporting member at the ends of said rollers; bearing blocks mounted in each of said bridging blocks for sliding movement toward and away from said supporting member, each of said bearing blocks rotatably supporting one end of an associated roller; and resilient means independently urging each of said bearing blocks and the end of said roller carried thereby toward said film.

4. A pressure plate adapted to urge a film or web against an opening, which includes: a supporting member having a plurality of parallel grooves formed therein in the surface adjacent said opening; a plurality of parallel rollers adapted to bear against said film, each of said rollers being associated with a corresponding groove, and each of said rollers having, at one end of said supporting member, a curved surface of relatively small radius connecting the end surface and the cylindrical surface of said roller; a pair of bridging blocks attached to said supporting member at the ends of said rollers and extending across said grooves; bearing blocks mounted in each of said bridging blocks for sliding movement toward and away from said supporting member, each of said bearing blocks rotatably supporting one end of an associated roller; and spring means independently urging each of said bearing blocks and the end of said roller carried thereby toward said film.

5. A pressure plate adapted to urge a film or web against an opening, which includes: a supporting member adapted to be mounted adjacent said opening but spaced therefrom, and having a plurality of parallel grooves formed therein in the surface adjacent said opening, said grooves extending beyond said opening on opposite sides thereof; a bridging block attached to said supporting member near each end of said grooves, each of said blocks extending across said grooves and having openings formed therein aligned with said grooves; a bearing block slidably mounted in each of said openings in said bridging blocks, each of said bearing blocks extending into the associated groove and being held against removal from said bridging block thereby; a roller associated with each of said parallel grooves and comprising a tubular member of relatively hard material provided with a shaft at each end thereof, each of said stub shafts being journalled into a corresponding bearing block for rotatably supporting said roller, the surface of each of said rollers at the intersection of one end and the cylindrical surface thereof being formed in a curve of relatively small radius; and a leaf spring mounted in each of said parallel grooves to bear against said bearing blocks and urge the latter and the roller associated therewith toward said film.

6. A pressure plate adapted to urge a film or web against an opening, which includes: a supporting member; a plurality of parallel rollers adapted to bear against said film; a pair of bridging blocks attached to said supporting member at the ends of said rollers; bearing blocks mounted in each of said bridging blocks for sliding movement toward and away from said supporting member, each of said bearing blocks rotatably supporting one end of an associated roller; and resilient means independently urging each of said bearing blocks and the end of said roller carried thereby toward the film.

7. A pressure plate adapted to urge a film or web against an opening, which includes: a supporting member adapted to be mounted adjacent said opening but spaced therefrom, and having a plurality of parallel grooves formed therein in the surface adjacent said opening, said grooves extending beyond said opening on opposite sides thereof; a bridging block attached to said supporting member near each end of said grooves, each of said blocks extending across said grooves; and having openings formed therein aligned with said grooves; a bearing block slidably mounted in each of said openings in said bridging blocks, each of said bearing blocks extending into the associated groove and being held against removal from said bridging block thereby; a roller associated with each of said parallel grooves and comprising a cylindrical member of relatively hard material provided with a shaft at each end thereof, each of said shafts being journalled into a corresponding bearing block for rotatably supporting said roller; and a leaf spring mounted in each of said parallel grooves to bear against said bearing blocks and urge the latter and the roller associated therewith toward the film.

EDWARD FURER.

REFERENCES CITED

The following references are of record in the file of this patent:

UNITED STATES PATENTS

| Number | Name | Date |
|---|---|---|
| 1,074,177 | Huntoon et al. | Sept. 30, 1913 |
| 1,437,895 | Horst | Dec. 5, 1922 |
| 1,922,742 | Mitchell | Aug. 15, 1933 |
| 2,234,714 | Wellman | Mar. 11, 1941 |

FOREIGN PATENTS

| Number | Country | Date |
|---|---|---|
| 388,576 | Germany | Jan. 19, 1924 |
| 242,836 | Great Britain | Nov. 19, 1925 |
| 328,784 | Great Britain | May 8, 1930 |
| 550,387 | Germany | May 11, 1932 |